United States Patent [19]

Fujii et al.

[11] Patent Number: 5,391,607
[45] Date of Patent: Feb. 21, 1995

[54] THERMOPLASTIC RESIN COMPOSITION

[75] Inventors: Takeshi Fujii, Chiba; Masashi Yamamoto, Ichihara, both of Japan

[73] Assignee: Sumitomo Chemical Company, Limited, Osaka, Japan

[21] Appl. No.: 152,100

[22] Filed: Nov. 15, 1993

Related U.S. Application Data

[63] Continuation of Ser. No. 661,241, Feb. 27, 1991, abandoned.

[51] Int. Cl.$^6$ .................. C08L 51/06; C08L 23/12
[52] U.S. Cl. .................. 524/449; 524/451; 524/504; 525/64
[58] Field of Search ............ 525/64; 524/449, 451, 524/504

[56] References Cited

U.S. PATENT DOCUMENTS

| | | | |
|---|---|---|---|
| 4,628,072 | 12/1986 | Shiraki | 525/57 |
| 4,981,896 | 1/1991 | Okada et al. | 524/413 |

FOREIGN PATENT DOCUMENTS

| | | |
|---|---|---|
| 0177151 | 4/1986 | European Pat. Off. |
| 0335394 | 10/1989 | European Pat. Off. |
| 0336320 | 10/1989 | European Pat. Off. |
| 0337214 | 10/1989 | European Pat. Off. |
| 51-144452 | 12/1976 | Japan . |
| 59-115352 | 7/1984 | Japan . |
| 60-137958 | 7/1985 | Japan . |

*Primary Examiner*—Patricia A. Short
*Attorney, Agent, or Firm*—Stevens, Davis, Miller & Mosher

[57] ABSTRACT

The thermoplastic resin composition of the present invention contains
(a) a resin composition consisting of
 (1) at least one polypropylene resin (E) selected from the group consisting of
  (i) a graft polypropylene (A) obtained by graft polymerizing an unsaturated carboxylic acid or a derivative thereof onto a polypropylene (C),
  (ii) a graft polypropylene (B) obtained by graft polymerizing an unsaturated carboxylic acid or a derivative thereof and an unsaturated aromatic monomer onto a polypropylene (C),
  (iii) a composition (D) selected from the group consisting of
   a composition of a polypropylene (C) and the graft polypropylene (A),
   a composition of a polypropylene (C) and the graft polypropylene (B),
   a composition of a polypropylene (C), the graft polypropylene (A) and the graft polypropylene (B), and
 (2) a saturated polyester resin (F)
(b) an epoxy group-containing copolymer (G), and
(c) at least one member selected from the group consisting of
 (i) a rubbery substance (H),
 (ii) a modified rubbery substance (I), and
 (iii) a mixture of the rubbery substance (H) and the modified rubbery substance (I), the content of the saturated polyester resin (F) in the thermoplastic resin composition being not more than 50% by weight; or
(a) either a graft resin composition (J) obtained by graft polymerizing an unsaturated carboxylic acid or a derivative thereof onto a mixture of a polypropylene (C) and a rubbery substance (H), or a graft resin composition (K) obtained by graft polymerizing an unsaturated carboxylic acid or a derivative thereof and an unsaturated aromatic monomer onto a mixture of a polypropylene (C) and a rubbery substance (H),
(b) a saturated polyester resin (F),
(c) an epoxy group-containing copolymer (G), and
(d) a polypropylene (C);

which thermoplastic resin composition is suitably used in the fields where high level of heat resistance, impact resistance, and especially low-temperature impact resistance are required.

10 Claims, 1 Drawing Sheet

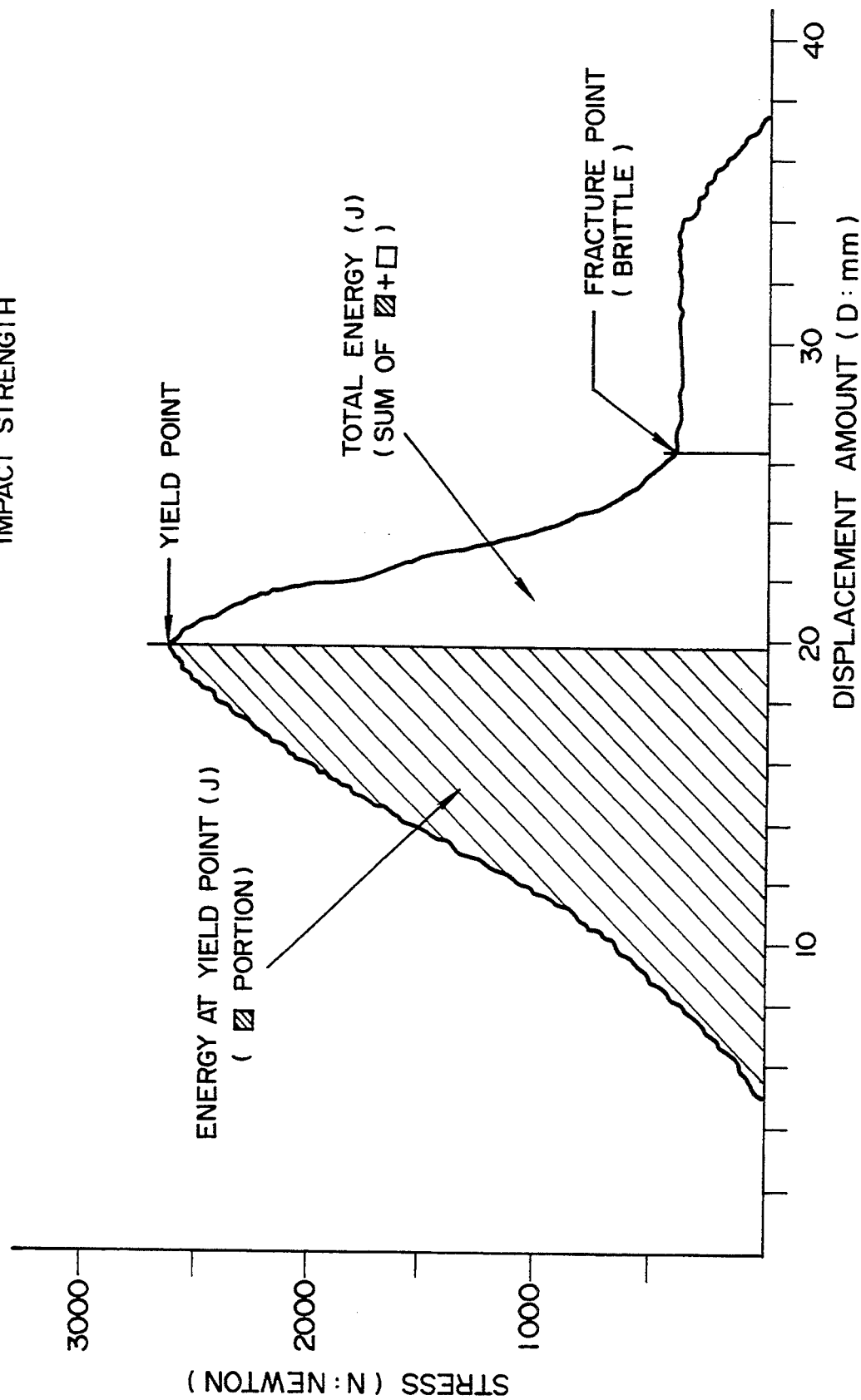

THERMOPLASTIC RESIN COMPOSITION

This application is a continuation of application Ser. No. 07/661,241, filed Feb. 27, 1991, now abandoned.

The present invention relates to a novel thermoplastic polypropylene resin composition which is utilizable in a form of molded articles, sheets, films, etc., by means of injection molding, extrusion molding.

More specifically, the present invention relates to a novel thermoplastic polypropylene-based resin composition which has an excellent physical property balance and excellent appearance, and which is formed by incorporating an epoxy group-containing copolymer into a polypropylene-based resin and an unsaturated polyester resin.

Polypropylenes have heretofore been widely used in the form of molded articles, films and sheets due to their excellent molding processability, toughness, water resistance, gasoline resistance, chemical resistance, etc., and due to their low specific gravity and low cost.

However, polypropylenes have defect, which should be improved, in heat resistance, stiffness, impact resistance, scratch resistance, coating properties, adhesive properties, printability, etc., and these defects constitute an obstacle to the application of polypropylenes to new areas in practical use.

In order to improve coating properties, adhesive properties, printability, etc., of the above properties, JP-B-58-47418 and JP-A-58-49738, etc., propose a method of partially or wholly graft-modifying a polypropylene with an unsaturated carboxylic acid or an anhdyride thereof such as maleic anhydride, for example. However, even when such a modified polypropylene is used, the impact resistance, heat resistance, stiffness and the other properties are not essentially improved.

Meanwhile, unsaturated polyester resins are widely used as an engineering resin having characteristic heat resistance, stiffness, strength and oil resistance in the fields of automobile parts and electric and electronic parts. However, it is desired to improve the unsaturated polyester resins further in moldability, impact resistance, water resistance and chemical resistance. The unsaturated polyester resins further have inherent disadvantages in that they have a high specific gravity and are expensive.

From such a viewpoint, a wide new area in use is expected if a thermoplastic resin having features of both a polypropylene-based resin and a saturated polyester resin can be obtained by blending a polypropylene-based resin selected from a graft polypropylene and a graft polypropylene/polypropylene composition with an saturated polyester resin.

However, it has been conventionally considered that a polypropylene-based resin is poor in compatibility and dispersibility with a saturated polyester resin, and a mere blend of these actually causes the following problems.

(1) A molten polymer shows a high Barus effect, and it is substantially impossible to take off an extruded strand stably. Thus, the mere blend of these resin lowers the molding workability of the resulting blend to a great extent.

(2) The injection-molded article of the resulting blend shows an extreme nonuniformity and poor appearance due to the occurrence of flow marks so that it is not practically usable as automobile-parts, electric or electronic parts, etc.

(3) The molded article formed of a mixture of a polypropylene-based resin with a saturated polyester resin often show lower values in mechanical properties, in particular, impact resistance, tensile elongation, etc., than expected from the additivity of the individual properties of these components.

According to the method described in JP-A-61-60746, it is possible to impart a polypropylene and a saturated polyester, which are inherently incompatible with each other, with mutual compatibility and dispersiblity by incorporating an epoxy group-containing copolymer into a mixture of a polypropylene-based resin selected from a modified polypropylene and a modified polypropylene/polypropylene composition and a saturated polyester resin, and it is thus possible to produce a thermoplastic resin composition which has well balanced physical properties among molding processability, stiffness, heat resistance, impact resistance, scratch resistance, coating properties, oil resistance, chemical resistance, water resistance, etc., and the excellent appearance uniformity and smoothness.

However, the thermoplastic resin composition for use as automobile parts and electric and electronic parts is required to have a high-level of heat resistance, impact resistance, etc., and in particular, a low-temperature impact resistance. As a result of a diligent study in order to further improve the heat resistance and impact resistance of the thermoplastic resin composition disclosed in JP-A-61-60746, the present invention has been completed.

According to the present invention, there are provided a thermoplastic resin composition which comprises:

(a) 100 parts by weight of a resin composition consisting of
  (1) 1–99% by weight of at least one polypropylene resin (E) selected from the group consisting of
    (i) a graft polypropylene (A) obtained by graft polymerizing an unsaturated carboxylic acid or a derivative thereof onto a polypropylene (C),
    (ii) a graft polypropylene (B) obtained by graft polymerizing an unsaturated carboxylic acid or a derivative thereof and an unsaturated aromatic monomer onto a polypropylene (C),
    (iii) a composition (D) selected from the group consisting of
      a composition of a polypropylene (C) and a graft polypropylene (A) obtained by graft polymerizing an unsaturated carboxylic acid or a derivative thereof onto a polypropylene (C),
      a composition of a polypropylene (C) and a graft polypropylene (B) obtained by graft polymerizing an unsaturated carboxylic acid or a derivative thereof and an unsaturated aromatic monomer onto a polypropylene (C),
      a composition of a polypropylene (C), a graft polypropylene (A) obtained by graft polymerizing an unsaturated carboxylic acid or a derivative thereof onto a polypropylene (C) and
      a graft polypropylene (B) obtained by graft polymerizing an unsaturated carboxylic acid or a derivative thereof and an unsaturated aromatic monomer onto a polypropylene (C), and (2) 99-1% by weight of a saturated polyester resin (F), (b) 0.1-300 parts by weight of an epoxy group-containing copolymer (G), and (c) 0.1-300 parts by weight of at least one member selected from the group consisting of
   (i) a rubbery substance (H),
   (ii) a modified rubbery substance (I), and
   (iii) a mixture of the rubbery substance (H) and the modified rubbery substance (I), the content of the saturated polyester resin (F) in the thermoplastic resin composition being not more than 50% by weight;

a thermoplastic resin composition which comprises:
   (a) 100 parts by weight of a graft resin composition (J) obtained by graft polymerizing an unsaturated carboxylic acid or a derivative thereof onto a mixture of 1-99% by weight of a polypropylene (C) and 99-1% by weight of a rubbery substance (H),
   (b) 0.1-600 parts by weight of a saturated polyester resin (F),
   (c) 0.1-300 parts by weight of an epoxy group-containing copolymer (G), and
   (d) at most 1,900 parts by weight of a polypropylene (C), the content of the saturated polyester resin (F) in the thermoplastic resin being not more than 50% by weight; and a thermoplastic resin composition which comprises:
   (a) 100 parts by weight of a graft resin composition (K) obtained by graft polymerizing an unsaturated carboxylic acid or a derivative thereof and an unsaturated aromatic monomer onto a mixture of 1-99% by weight of a polypropylene (C) and 99-1% by weight of a rubbery substance (H),
   (b) 0.1-600 parts by weight of a saturated polyester resin (F),
   (c) 0.1-300 parts by weight of an epoxy group-containing copolymer (G), and
   (d) at most 1,900 parts by weight of a polypropylene (C), the content of the saturated polyester resin (F) in the thermoplastic resin composition being not more than 50% by weight.

BRIEF DESCRIPTION OF THE DRAWING

FIG. 1 shows one example of measurement charts in evaluation of penetration impact strength, in which the abscissa axis indicates a displacement amount (D: mm) for deformation of a test piece and the ordinate axis indicates a stress (N: newton) to a displacement amount.

A yield point is a point where a stress to a displacement amount changes from increment to decrement, and a breaking point is a point where a material is fractured and a change in stress disappears.

A yield point energy is an area integration of a displacement amount and stress from a start of stress detection to a yield point of a material, and a total energy is an area integration of a displacement amount and stress from a start to a breaking point.

The polypropylene resin composition (E) used in the present invention is a resin selected out of a graft polypropylene (A) and/or a graft polypropylene (B), and a composition (D) containing a polypropylene (C) the graft polypropylene (A) and/or the graft polypropylene (B).

The term "polypropylene" will be detailed below.

In the present specification, the term "polypropylene" is used to mean a starting material for the graft polypropylene (A) or the graft polypropylene (B), or the polypropylene (C).

In the present invention, the "polypropylene" is a crystalline polypropylene, which includes, besides a polypropylene homopolymer, a block copolymer obtained by polymerizing propylene at a first step and copolymerizing the resultant polypropylene with ethylene and an α-olefin such as propylene, butene-1, etc., at a second step, and a random copolymer obtained by copolymerizing propylene with an α-olefin such as ethylene, butene-1, etc.

The polypropylene homopolymer, block copolymer or random copolymer can be generally produced by polymerization, e.g. in the presence of a combined catalyst of titanium trichloride with an alkyl aluminum compound which is generally called Ziegler-Natta catalyst.

The polymerization can be carried out at a temperature between 0° C. and 300° C. In high-stereoregularity polymerization of an α-olefin such as propylene, etc., however, a polymer having high stereoregularity cannot be obtained at a temperature of more than 100° C. For this reason and some others, the polymerization is carried out preferably at a temperature between 0° C. and 100° C.

The polymerization pressure is not critical, and can be desirably selected from about 3 to about 100 atmospheric pressures from an industrial and economical point of view.

The polymerization method may be any of a continuous method and a batch method.

The polymerization method can be selected from a slurry polymerization method using an inert hydrocarbon solvent such as butane, pentane, hexane, heptane, octane, or the like, a solvent polymerization method in which a resulting polymer is dissolved in one of the inert hydrocarbon solvents, a solventless bulk polymerization method in which a liquefied monomer is polymerized, and a gas phase polymerization method in which a gaseous monomer is polymerized.

In order to regulate the molecular weight of the resultant polymer, a chain transfer agent such as hydrogen may be added.

The polypropylene used in the present invention can be produced in the presence of an isospecific Ziegler-Natta catalyst. A catalyst having high isospecificity is preferred.

It is preferred to use a catalyst whose transition metal catalyst component is a composite solid compound of a titanium trichloride or magnesium compound, which have a layer crystalline structure, and a titanium compound and whose typical metal component is an organoaluminum compound. The catalyst may contain a known electron-donating compound as a third component.

The titanium trichloride is selected from those which are produced by reduction of titanium tetrachloride with a variety of reducing agents. As a reducing agent, there are known metals such as aluminum, titanium, etc., hydrogen, an organometal compound, and the like. A typical example of the titanium trichloride produced by metal reduction is a titanium trichloride composition containing activated aluminum chloride ($TiCl_3AA$), produced by reducing titanium tetrachloride with metal aluminum and then pulverizing the resultant mixture in an apparatus such as a ball mill, a vibration mill, etc. In order to improve isospecificity, polymerization activity and/or particulate properties of the catalyst, the above pulverization may be carried out in the copresence of a compound selected from an ether, a ketone, an ester, aluminum chloride, titanium tetrachloride, etc.

More preferred for the object of the present invention is titanium trichloride which is obtained by reducing titanium tetrachloride with an organoaluminum compound, and catalytically reacting the resultant titanium trichloride with an ether compound and with a halogen compound at the same time or consecutively. Preferred is an ether compound which has the general formula of $R^1$—O—$R^2$ (in which each of $R^1$ and $R^2$ is an alkyl group having 1 to 18 carbon atoms), and particularly preferred are di-n-butyl ether and di-t-amyl ether. The halogen compound is selected preferably from halogen atoms, iodine in particular; halogen compounds, iodine trichloride in particular; titanium halides, titanium tetrachloride in particular; and hydrocarbon halides, carbon tetrachloride and 1,2-dichloroethane in particular. The organoaluminum compound has the general formula of $AlR^3{}_nX_{3-n}$ in which $R^3$ is a hydrocarbon group having 1 to 18 carbon atoms, X is a halogen selected from Cl, Br and I, and n is defined by $3 \geq n > 1$, and particularly preferred are diethylaluminum chloride and ethylaluminum sesquichloride.

The process for the production of the above titanium trichloride is specifically disclosed in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a layer crystalline structure is used as a transition metal compound component, it is preferred to use, as typical metal compound component, an organoaluminum compound having the general formula of $AlR^4{}_mX_{3-m}$ in which $R^4$ is a hydrocarbon group having 1 to 18 carbon atoms, X is a halogen selected from Cl, Br and I, and m is defined by $3 \geq m > 0$. Particularly preferred from the object of the present invention is an organoaluminum compound of the above general formula in which $R^4$ is an ethyl or isobutyl group and m is defined by $2.5 \geq m > 1.5$. Specific examples thereof are diethylaluminum chloride, diethylaluminum bromide, diethylaluminum iodide, and mixtures of these with either triethylaluminum or ethylaluminum dichloride. When a third compound to be described later is used in combination, preferred for the object of the present invention is also an organoaluminum compound of the, above general formula in which m is defined by $3 \geq m > 2.5$ or $1.5 \geq m > 0$.

The molar ratio of the organoaluminum compound to titanium trichloride can be selected from the range between 1:1 and 1,000:1.

The catalyst comprising titanium trichloride and organoaluminum may contain a known third component. Examples of the third component are ester compounds such as ε-caprolactam, methyl methacrylate, ethyl benzoate, methyl toluylate, etc.; phosphite esters such as triphenyl phosphite, tributyl phosphite, etc.; and phosphoric acid derivatives such as hexamethylphosphoric triamide, etc.; and the like.

The amount of the third component is to be experimentally determined with each of the above compounds, since they differ in activity. In general, said amount is not more than an equimolar amount to that of the organoaluminum.

When a composite solid compound of a magnesium compound and a titanium compound is used as a transition metal solid catalyst component, it is preferred to use, as a typical metal catalyst component, an organoaluminum compound, and it is particularly preferred to use, as such, a compound having the general formula of $AlR^5{}_pX_{3-p}$ in which $R^5$ is a hydrocarbon group having 1 to 18 carbon atoms, X is a halogen selected from Cl, Br and I and p is defined by $3 \geq p > 2$. Specific examples thereof are triethylaluminum, triisobutylaluminum and mixtures of these with either diethylaluminum chloride or diisobutylaluminum chloride.

The catalyst also preferably contains an electron-donating compound, particularly an aromatic monocarboxylic acid ester and/or a silicon compound containing an Si—$OR^6$ bond.

As the silicon compound containing an Si—$OR^6$ bond, in which $R^6$ is a hydrocarbon group having 1 to 20 carbon atoms, preferred is an alkoxysilane compound having the general formula of $R^7{}_aSi(OR^6)_{4-a}$ in which each of $R^6$ and $R^7$ is a hydrocarbon group having 1 to 20 carbon atoms and a is defined by $0 \leq a \leq 3$. Specific examples thereof are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The amount of the above electron-donating compound per mole of the organoaluminum compound is preferably not more than 1 mole, particularly preferably 0.05 to 1 mole.

The composite solid compound of a magnesium compound and a titanium compound is selected from titanium trichloride containing a chloride of magnesium obtained by reducing titanium tetrachloride with an organomagnesium compound, and the so-called "supported catalyst" prepared by catalytically reacting a solid magnesium compound with a liquid-phase titanium compound. The solid magnesium compound preferably contains an electron-donating compound, particularly an aromatic monocarboxylic acid ester, an aromatic dicarboxylic acid diester, an ether compound, alcohols and/or phenolic compounds. The aromatic monocarboxylic acid ester may be co-present when the solid magnesium compound is catalytically reacted with the titanium compound.

The above composite solid compound of a magnesium compound and a titanium compound is disclosed in many patent publications, and those suitable for the object of the present invention are specifically disclosed in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, etc.

When the thermoplastic resin composition of the present invention is used particularly in fields where heat resistance, stiffness, scratch resistance, etc. are required, it is desirable to use a highly crystalline polypropylene in which the homopolymer of propylene or the homopolymer portion as a first segment polymerized in the first step of block-copolymerizing propylene has an isotactic pentad of the boiling heptane-insoluble portion of 0.970 or more, a content of the boiling heptane-soluble portion of not more than 5% by weight and a content of 20° C. xylene-soluble portion of not more than 2.0% by weight.

The above isotactic pentad of the boiling heptane-insoluble portion, the content of the boiling heptane-soluble portion and the content of the 20° C. xylene-soluble portion are determined as follows.

5 Grams of a polypropylene was completely dissolved in 500 ml of boiling xylene, and the resultant solution was cooled to 20° C., and allowed to stand for 4 hours. Then, the solution was filtered to separate a 20° C. xylene-insoluble portion. Xylene was evaporated by concentrating the filtrate and solidifying it by drying, and the residue is further dried under reduced pressure at 60° C. to obtain a polymer soluble in xylene at 20° C. The content of the 20° C. xylene-soluble portion is determined by dividing the dry weight of the polymer by the weight of the charged sample, and represented by percentage. The above 20° C. xylene-insoluble portion was dried, and then extracted with boiling n-heptane in a Soxhlet apparatus for 8 hours. The extraction residue is referred to as a boiling heptane-insoluble portion, and the content of the boiling heptane-insoluble portion is determined by subtracting the dry weight of the boiling heptane-insoluble portion from the weight (5 g) of the charged sample and dividing the remainder by the weight of the charged sample, and represented by percentage.

The "isotactic pentad" refers to a fraction of a propylene monomer unit present in the central position of an isotactic chain of a polypropylene molecule chain in a pentad unit or a chain formed of meso-bonded five successive propylene monomer units, determined by a method disclosed by A. Zambelli et al., in Macromolecules 6, 925 (1973), i.e. a method using $^{13}$C-NMR. NMR absorption peaks are assigned on the basis of the subsequently issued Macromolecules 8, 687 (1975).

Specifically, the isotactic pentad is determined on the basis of a relative ratio of the area of mmmm peaks to the total area of the absorption peaks assigned to methyl carbons. According to this method, the NPL standard substance CRM No. M19-14 Polypropylene PP/MWD/2 provided by the National Physical Laboratory in United Kingdom was measured for an isotactic pentad to show 0.944.

The above highly crystalline polypropylene can be prepared by any of the methods disclosed in JP-A-60-28405, JP-A-60-228504, JP-A-61-218606, JP-A-61-287917, etc.

When the thermoplastic propylene resin composition of the present invention is used in fields where impact resistance is required, it is preferred to use, as a polypropylene, a propylene block copolymer produced by co-polymerizing a propylene homopolymer portion, as the first segment polymerized in the first step, with ethylene and an α-olefin such as propylene, butene-1, etc., as the second segment in the second step.

The propylene block copolymer can be prepared by a slurry polymerization or gas phase polymerization method. In particular, when the thermoplastic resin composition is used in a field where high impact resistance is required, it is required to increase the amount of the second segment, and such a propylene block copolymer can be suitably prepared by a gas phase polymerization method.

Such a polypropylene having a high impact resistance can be prepared by a gas phase polymerization method disclosed, e.g. in JP-A-61-287917.

In the propylene block copolymer, the propylene homopolymer portion polymerized in the first step may be any of a propylene homopolymer or a copolymer of propylene with ethylene or an α-olefin having 4 to 6 carbon atoms, provided that the content of the ethylene or α-olefin units in the resultant polymer is not more than 6 mole %. The copolymer portion as the second segment polymerized in the second step is preferably a polymer of ethylene or a copolymer of ethylene, propylene and optionally an α-olefin having 4 to 6 carbon atoms provided that the ethylene content is not less than 10 mole %. The amount of the polymer formed in the second step is 10 to 70% by weight based on the propylene block copolymer.

In a slurry polymerization method, a propylene block copolymer having a second segment content of 10 to 30% by weight is suitably produced, and in a gas phase polymerization method, a propylene block copolymer having a second segment content of 10 to 70% by weight is suitably produced.

In the gas phase polymerization method, a propylene block copolymer having a larger content of the second segment can be prepared by a process disclosed in JP-A-1-98604, and such a copolymer can be suitably used in a field where ultrahigh impact resistance is required.

The intrinsic viscosity of the second segment in decalin at 135° C. should be changed depending upon the production efficiency, physical properties of a product powder and the intrinsic viscosity of the first segment. In general, however, the second segment according to a slurry polymerization method has an intrinsic viscosity of about 3 to 8 dl/g, and the second segment according to a gas phase polymerization method has an intrinsic viscosity of i to 5 dl/g.

In the present invention, the graft polypropylene (A) can be obtained by graft-polymerizing an unsaturated carboxylic acid or a derivative thereof as a graft monomer onto the polypropylene, and the graft polypropylene (B) can be obtained by graft-polymerizing an unsaturated carboxylic acid or a derivative thereof and an unsaturated aromatic monomer as graft monomers onto the polypropylene, if necessary, in the presence of a radical initiator.

The above graft monomers can be grafted on the polypropylene according to various conventional methods.

For example, the grafting can be carried out by a method which comprises mixing the polypropylene, the graft monomer(s) and a radical-generating agent and melt-kneading the resultant mixture in a melt-kneading apparatus, or by a method which comprises dissolving the polypropylene in an organic solvent such as xylene, adding a radical-generating agent under nitrogen atmosphere, carrying out a reaction of the resultant mixture by heating it with stirring, cooling the reaction mixture after the reaction, washing the reaction product, filtering it and drying it. Besides the above methods, there can be employed a method which comprises irradiating the polypropylene with ultraviolet light or radiation in the presence of the graft monomer(s) or a method which comprises bringing the polypropylene into contact with oxygen or ozone in the presence of the graft monomer(s).

In view of economical benefit, etc., the most preferred is the graft polymerization method which comprises melt-kneading the polypropylene and graft monomer(s) in a melt-kneading apparatus.

The melt-kneading of the polypropylene and an unsaturated carboxylic acid or a derivative thereof, if necessary, in the presence of a radical initiator can be carried out with an extruder, a Banbury mixer, a kneader, etc. at a temperature of 150° to 300° C., preferably 190° to 280° C. for a residence time of 0.3 to 10 minutes, preferably 0.5 to 5 minutes. It is industrially advantageous to continuously produce a graft polypropylene with a single- or twin-screw extruder with keeping the vent holes in a vacuous state and removing unreacted components (unsaturated carboxylic acid or a derivative thereof, unsaturated aromatic monomer, radical initiator, etc.) and by-products such as oligomers and decomposition products of these components. The reaction may be carried out in air, but is preferably carried out in an inert gas such as nitrogen or carbon dioxide. In addition, in order to further remove a trace amount of the unreacted components and by-products contained in the graft polypropylene, the graft polypropylene may be heat-treated at a temperature of 60° C. or higher, extracted with a solvent and vacuumed while it is melted.

A variety of additives may be optionally added to the graft polypropylene (A) or (B) during the modification or post-treatment. Examples of such additives are an antioxidant, a heat stabilizer, a light stabilizer, a nucleating agent, a lubricant, an anti-static agent, an inorganic or organic colorant, a rust preventive, a crosslinking agent, a foaming agent, a plasticizer, a fluorescent agent, a surface treating agent, a surface brightener, etc.

Examples of the unsaturated carboxylic acid or the derivative thereof, used in the graft polypropylene (A) or (B) are unsaturated carboxylic acids such as acrylic acid, methacrylic acid, maleic acid, itaconic acid, citraconic acid, bicyclo[2,2,1]hepta-5-ene-2,3-dicarboxylic acid (himic acid), bicyclo[2,2,21octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo[2,2,11octa-7-ene-2,3,5,6-tetracarboxylic acid, 7-oxabicyclo[2,2,1]hepta-5-ene-2,3-dicarboxylic acid, etc.; and acid anhydrides, esters, amides, imides and metal salts of the unsaturated carboxylic acids such as maleic anhydrides, itaconic anhydride, citraconic anhydrides, bicyclo[2,2,1]hepta-5-ene-2,3-dicarboxylic acid anhydride (himic anhydride), monoethyl maleate, monoethyl fumarate, monomethyl itaconate, monomethyl fumarate, dimethylaminoethyl methacrylate, dimethylaminopropylacrylamide, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid-diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, potassium methacrylate, etc.

Of these, maleic anhydride is most preferred.

The most preferred example of the unsaturated aromatic monomer used in the graft polypropylene (B) is styrene. Other examples of the unsaturated aromatic monomer are o-methylstyrene, p-methylstyrene, m-methylstyrene, α-methylstyrene, vinyltoluene, divinylbenzene. These compounds may be used in combination.

The graft polypropylene can be produced in the absence of a radical initiator. In general, however, it is carried out preferably in the presence of a radical initiator. The radical initiator can be selected from known radical initiators. Examples of the radical initiator are azo compounds such as 2,2'-azobisisobutyronitrile, 2,2'-azobis[2,4,4]-trimethylvaleronitrile, etc.; and various organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis-(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butyloxypivarate, t-butyloxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropylcarbonate, polystyrene peroxide, etc.

In the production of the graft polypropylene (A) or (B), the melt flow rate of the polypropylenes as a starting material (crystalline propylene homopolymer, crystalline propylene-ethylene/α-olefin block copolymer, crystalline propylene-ethylene/α-olefin random copolymer, etc.) is not critical. In general, however, it is 0.05 to 60 g/10 minutes, preferably 0.1 to 40 g/10 minutes. Further, it is desirable to select polypropylenes as a starting material such that the melt flow rate of the resultant modified polypropylene (A) or (B) is 0.1 to 100 g/10 minutes, preferably 0.5 to 50 g/10 minutes. The polypropylene as a starting material has usually a number average molecular weight of 7,000 to 800,000, preferably 10,000 to 700,000.

In the production of the graft polypropylene (A) or (B), the amount of each component per 100 parts by weight of the polypropylene are as follows. The amount of the unsaturated carboxylic acid or a derivative thereof is preferably 0.01 to 10 parts by weight, more preferably 0.1 to 5 parts by weight; that of the unsaturated aromatic monomer is 0.01 to 10 parts by weight, more preferably 0.1 to 5 parts by weight; and that of the radical initiator is preferably 0 to 5 parts by weight, more preferably 0.001 to 2 parts by weight. When the amount of the unsaturated carboxylic acid or a derivative thereof, or the amount of the unsaturated aromatic monomer, is less than 0.01 parts by weight, there is no remarkable effect on the modification. When it exceeds 10 parts by weight, the effect on the modification arrives at its limit, and no further effect is exhibited. Moreover, the use of such an excess amount thereof is practically undesirable, since a large amount of such a component remains unreacted in the resultant polymer, which causes offensive smell and a degradation in the physical properties of the resultant resin composition. The use of the radical initiator in an amount of more than 5% by weight is practically undesirable, since it gives no further remarkable effect on the graft reaction of the unsaturated carboxylic acid or a derivative thereof and since the polypropylene is decomposed to a great extent to change the fluidity (melt flow rate) greatly.

In the present invention, the polypropylene resin (E) selected out of the graft polypropylene (A), the graft polypropylene (B) and the composition (D) of the graft polypropylene (A) and/or the graft polypropylene (B) with the polypropylene (C) has a melt flow rate, preferably, of 0.1 to 100 g/10 minutes, particularly preferably, of 0.5 to 40 g/10 minutes.

In the present invention, the saturated polyester resin (F) is derived from a dicarboxylic acid component of which at least 40 mole % is terephthalic acid and a diol component. The dicarboxylic acid component other than the above terephthalic acid can be selected from aliphatic dicarboxylic acids having 2 to 20 carbon atoms such as adipic acid, sebacic acid, dodecanedicarboxylic acid, etc.; aromatic dicarboxylic acids such as isophthalic acid, naphthalenedicarboxylic acid, etc.; and alicyclic dicarboxylic acids such as cyclohexanedicarboxylic acid, etc. The compounds may be used alone or in combination. The above diol component can be selected from aliphatic glycols and alicyclic glycols such as ethylene glycol, 1,3-propanediol, 1,4-butanediol, 1,6-hexanediol, 1,1-decanediol, 1,4-cyclohexanediol, etc.; and these compounds may be used alone or in combination.

Of these compounds for the saturated polyester resin (F), polybutylene terephthalate or polyethylene terephthalate are preferred to exhibit the effects of the present invention further desirably. The saturated polyester resin (F) preferably has an intrinsic viscosity, measured in o-chlorophenol at 25° C., of 0.5 to 3.0 dl/g. When there is used a saturated polyester resin having an intrinsic viscosity outside the above range as the saturated polyester resin (F), it does not tend to be possible to achieve the intended mechanical strength.

In the present invention, the epoxy group-containing copolymer (G) is a copolymer composed of an unsaturated epoxy compound and an ethylenically unsaturated compound.

The composition ratio of the epoxy group-containing copolymer (G) is not critical. In general, however, the proportion of the unsaturated epoxy compound is 0.1 to 50% by weight, preferably 1 to 30% by weight.

The unsaturated epoxy compound is a compound containing in the molecule an unsaturated group copolymerizable with an ethylenically unsaturated compound and an epoxy group.

Examples of the unsaturated epoxy compound are unsaturated glycidyl esters and unsaturated glycidyl ethers which are represented by the following general formulae (1) and (2), respectively.

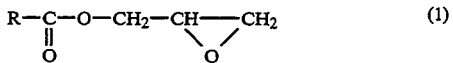

wherein R is a C$_{2-18}$ hydrocarbon group having an ethylenically unsaturated bond.

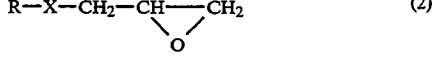

wherein R is a C$_{2-18}$ hydrocarbon group having an ethylenically unsaturated bond, and X is —CH$_2$—O— or

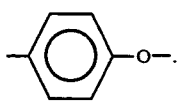

Specific examples of the unsaturated epoxy compound are glycidyl acrylate, glycidyl methacrylate, glycidyl itaconates, allylglycidyl ether, 2-methylglycidyl ether, styrene-p-glycidyl ether.

Examples of the ethylenically unsaturated compound are olefins, vinyl esters of a saturated carboxylic acid having 2 to 6 carbon atoms, esters of a saturated alcohol having 1 to 8 carbon atoms with either acrylic acid or methacrylic acid, maleic acid esters, methacrylic acid esters, fumaric acid esters, halogenated vinyls, styrenes, nitriles, vinyl ethers, acrylamides, etc.

Specific examples of the ethylenically unsaturated compound are ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Of these, ethylene is particularly preferred.

In order to improve the low-temperature impact resistance by decreasing a glass transition temperature, it is preferable to use vinyl acetate and/or methyl acrylate, etc., as a third component in addition to ethylene as a second component.

The epoxy group-containing copolymer can be prepared by various methods. It is possible to employ both at random copolymerization method in which the unsaturated epoxy compound is introduced into the main chain of the copolymer and a graft copolymerization method in which the unsaturated epoxy compound is introduced as a branch for the copolymer. The preparation method can be specifically selected from a method which comprises copolymerizing an unsaturated epoxy compound and ethylene in the presence of a radical-generating agent at 500 to 4,000 atmospheric pressure at 100° to 300° C. in the presence or absence of a suitable solvent and chain transfer agent, a method which comprises mixing a polypropylene with the unsaturated epoxy compound and a radical-generating agent and subjecting the resultant mixture to melt graft polymerization in an extruder and a method which comprises copolymerizing an unsaturated epoxy compound and the ethylenically unsaturated compound in an inert medium such as water or an organic solvent in the presence of a radical-generating agent.

The rubbery substance (H) which is used in the present invention to improve the impact resistance, low-temperature impact resistance in particular, can be selected from propylene-butene rubber, isoprene-butylene rubber, polyisoprene, polybutadiene, styrene-based block copolymers such as styrene-butadiene rubber, a styrene-butadiene-styrene block copolymer, a partially hydrogenated styrene-butadiene block copolymer, styrene-isoprene block copolymer, a partially hydrogenated styrene-isoprene block copolymer, etc., linear low-density polyethylene, and mixtures of these.

The modified rubbery substance (I) is obtained by graft-polymerizing an unsaturated carboxylic acid or a derivative thereof, or an unsaturated carboxylic acid or a derivative thereof and an unsaturated aromatic monomer, onto the above rubbery substance (I), if necessary, in the co-presence of a radical initiator or by introducing the unsaturated carboxylic acid or a derivative thereof, or a mixture of the unsaturated carboxylic acid or a derivative thereof with the unsaturated aromatic monomer, into the α-olefin main chain in the presence of a polymerization initiator or a catalyst.

Of the styrene-based block copolymers, particularly preferred is a partially hydrogenated styrene-butadiene block copolymer. The partially hydrogenated styrene-butadiene block copolymer is produced by partial hydrogenation of a styrene-butadiene block copolymer. The structure and production process thereof are described below.

As to the partially hydrogenated styrene-butadiene block copolymer, the number average molecular weight of the block copolymer rubber is 10,000 to 1,000,000, preferably 20,000 to 300,000; the number average molecular weight of the unsaturated aromatic polymer block A in the block copolymer rubber is 1,000 to 200,000, preferably 2,000 to 100,000; the number average molecular weight of the conjugated diene polymer block B is 1,000 to 200,000, preferably 2,000 to 100,000; and the weight ratio of the unsaturated aromatic polymer block A to the conjugated diene polymer block B is 2:98 to 60:40, preferably 10:90 to 40:60.

Many processes have been proposed for the production of the block copolymer rubber. A typical process is disclosed in Japanese Patent Publication Kokoku No. 40-23798, in which a block copolymer rubber of an unsaturated aromatic hydrocarbon and a diene hydrocarbon can be produced by block copolymerization in an inert solvents-in the presence of a lithium catalyst or a Ziegler-type catalyst.

Such a block copolymer rubber is hydrogenated in an inert solvent in the presence of a hydrogenation Catalyst, e.g. according to any of the methods disclosed in Japanese Patent Publications Kokoku Nos. 42-8704, 43-6636 and 46-20814. The hydrogenation is carried out so that at least 50%, preferably 80% or more of the polymer block B is hydrogenated and not more than 25% of the aromatic Unsaturated bonds in the unsaturated aromatic polymer is hydrogenated. One typical example of such a partially or completely hydrogenated block copolymer is on the market in the trade name of KRATON®-G, supplied by Shell Chemical, Ltd., U.S.A.

In the production of the modified rubbery substance (I), the method for graft-copolymerizing a graft monomer on the rubbery substance can be selected from a variety of known methods.

For example, the graft copolymerization is carried out by a method which comprises mixing a rubbery substance as a raw material, a graft monomer and a radical initiator and melt-kneading the mixture in a melt-kneading apparatus, or a method which comprises dissolving a rubbery substance as a raw material in an organic solvent such as xylene, adding a radical initiator under nitrogen atmosphere, allowing the mixture to react under heat with stirring, cooling the reaction mixture after the reaction, washing the reaction product, filtering it and drying it thereby to obtain a grafted rubbery substance. In addition to these, three are a method which comprises irradiating a rubbery substance as a raw material with ultraviolet light or radiation in the presence of a graft monomer, and method which comprises bringing a rubbery substance into contact with oxygen or ozone.

In view of economical benefit, it is most preferred to employ a graft copolymerization method in which the above components are melt-kneaded in a melt-kneading apparatus.

In the present invention, the modified rubbery substance (I) can be obtained by melt-kneading a rubbery substance as a raw material with an unsaturated carboxylic acid or a derivative thereof optionally in the co-presence of a radical initiator, or a rubbery substance as a raw material with an unsaturated carboxylic acid or an derivative thereof and an unsaturated aromatic monomer optionally in the co-presence of a radical initiator, with an extruder, Banbury mixer, kneader, or the like, at a temperature of 200° to 280° C. preferably 230° to 260° C. for a residence time of 0.2 to 10 minutes, which residence time varies depending upon the radical initiator.

The presence of too large an amount of oxygen during the kneading sometimes results in formation of a gel or serious coloring. Therefore, the kneading is carried out desirably in the substantial absence of oxygen.

When the kneading temperature is lower than 200° C., desirably large amount of unsaturated carboxylic acid anhydride is not grafted, and only a small effect is produced on improvement in the degree of the graft reaction. When the kneading temperature is higher than 280° C., undesirably, the effect on improvement in the degree of the graft reaction is small, and in some cases, formation of a gel, coloring, etc., are liable to occur.

The kneading machine is not critical. In general, an extruder is preferred since it permits continuous production, and the extruder preferably has a single screw or twin screws suitable for homogeneously kneading the various raw materials.

In order to remove unreacted components (unsaturated carboxylic acid or a derivative thereof, unsaturated aromatic monomer, radical initiator, etc.) and by-products such as oligomers and decomposition products thereof from the reaction product, the reaction product can be purified by effecting vacuum pump-suction through vent lines halfway along the extruder or at a site near its outlet, or by dissolving the reaction product in a suitable solvent to precipitate it. The reaction product can be also subjected to heat treatment at a temperature of not less than 60° C. and suction to vacuum with melting.

The above three or four components may be separately fed to a kneading machine, or alternatively, some or all of these components may be uniformly mixed in advance of feeding them. For example, it is possible to employ a kneading method which comprises impregnating a rubber with both a radical initiator and an unsaturated aromatic monomer, feeding the resulting rubber, and the unsaturated carboxylic acid or a derivative thereof at the same time and kneading the resultant mixture. It is also possible to employ a modification method which comprises feeding a radical initiator and/or an unsaturated carboxylic acid or a derivative thereof and an unsaturated aromatic monomer halfway along an extruder.

A variety of additives may be optionally added to the modified rubbery substance (I) during the modification or post-treatment. Examples of such additives are an antioxidant, a heat stabilizer, a light stabilizer, a nucleating agent, a lubricant, an anti-static agent, an inorganic or organic colorant, a rust preventive, a crosslinking agent, a foaming agent, a plasticizer, a fluorescent agent, a surface treating agent, a surface brightener, etc.

The unsaturated carboxylic acid or a derivative thereof and the radical initiator for use in the modified rubbery substance (I) can be selected from those compounds used for the production of the graft polypropylene (A). As an unsaturated aromatic monomer, styrene is most preferred. The unsaturated aromatic monomer can be also selected from o-methylstyrene, p-methylstyrene, α-methylstyrene, vinyltoluene, divinylbenzene and mixtures of these.

In the production of said modified rubbery substance (I), the unsaturated aromatic monomer is used to prevent gel formation and improve the graft reaction degree. Per 100 parts by weight of the rubbery substance as a raw material, the amount of the unsaturated aromatic monomer is preferably 0.2 to 20 parts by weight, and the amount of the unsaturated carboxylic acid or a derivative thereof is preferably 0.5 to 15 parts by weight. When the unsaturated aromatic monomer is used, the amount of the unsaturated carboxylic acid or a derivative thereof is preferably 0.5 to 15 parts by weight, and the weight ratio of unsaturated aromatic monomer to the unsaturated carboxylic acid or a derivative thereof is preferably 0.1 to 3.0, more preferably 0.5 to 2.0.

When the weight ratio of the unsaturated aromatic monomer to the unsaturated carboxylic acid or a derivative thereof is less than 0.1, sometimes no effect is observed on prevention of gel formation and improvement in degree of the graft reaction. Even when the above weight ratio exceeds 3.0, no further effect tends to be expected.

The amount used of the radical initiator depends on its kind and kneading conditions. In general, it can be used in an amount of 0.005 to 1.0 part by weight, preferably 0.01 to 0.5 part by weight per 100 parts by weight of the rubber as a raw material. When the amount of the radical initiator is less than 0.005 part by weight, desirably large amount of the unsaturated carboxylic acid or a-derivative thereof is not grafted, and an effect of combined use of the unsaturated aromatic monomer on an increase in an amount of the grafted unsaturated carboxylic acid or grafted derivative thereof is small. When the above amount exceeds 1.0 part by weight, gel formation is, undesirably, liable to occur.

The modified rubbery substance (I) obtained above preferably contains 0.1 to 5% by weight of the grafted unsaturated carboxylic acid or a derivative thereof and 0.1 to 5% by weight of the grafted unsaturated aromatic monomer and preferably has a Mooney viscosity (ML$_{1+4}$121° C.) of 5 to 120.

The modified rubbery substance (I) is also produced by another method in which the unsaturated carboxylic acid or a derivative thereof is introduced into the main chain of the rubbery substance by copolymerization in the presence of a polymerization initiator and a catalyst. In general, the modified rubbery substance can be produced by the following known high-pressure radical copolymerization method. That is, it can be produced by copolymerizing ethylene with a radical-polymerizable monomer (comonomer) in the presence of a free radical-generating agent such as organic peroxide, oxygen, etc. The copolymerization is generally carried out at a polymerization temperature of 130° to 300° C. under a polymerization pressure of 500 to 3,000 kg/cm$^2$.

The radical-copolymerizable monomer can be selected from unsaturated carboxylic acids such as acrylic acid, methacrylic acid, etc.; esterification products thereof; vinyl esters such as vinyl acetate, etc., and the like. Specific examples of the esterification products of unsaturated carboxylic acids are methyl acrylate, ethyl acrylate, methyl methacrylate, glycidyl methacrylate, etc. These comonomers can be used alone or in combination.

The comonomer content in the modified rubbery substance (I) directly polymerized is usually 0.1 to 40% by weight, preferably 1 to 35% by weight. When the comonomer content is less than 0.1% by weight, sometimes no effect is produced on the modification.

Of these copolymers, those specified as ethylene copolymer rubbers which are the raw materials for the rubbery substance (H) and the modified rubber substance (I) are excluded. Of these, an ethylene-acrylic acid copolymer and an ethylene-methacrylic acid copolymer are preferred.

Each of the graft resin compositions (J) and (K) is produced by co-modifying a polypropylene and the rubbery substance as raw materials at the same time by adding an unsaturated carboxylic acid or a derivative thereof or a mixture of an unsaturated carboxylic acid or a derivative thereof with an unsaturated aromatic monomer.

That is, the graft resin compositions (J) and (K) are produced by allowing the polypropylene and the rubbery substance as starting materials to be co-present and grafting either an unsaturated carboxylic acid or a derivative thereof or a mixture of an unsaturated carboxylic acid or a derivative thereof with an unsaturated aromatic monomer on them, optionally, in the presence of a radical initiator according to a similar method to those described concerning the production of the modified polypropylenes (A) and (B) and the modified rubbery substance (I). When the co-grafting is carried out, a partially hydrogenated styrene-butadiene block copolymer is most preferred as a rubbery starting material.

The polypropylene and rubbery substance as starting materials are allowed to be co-present according to various known methods as follows. When these two starting materials are pellets, powders or pulverized products, these materials are fed into a co-modifying apparatus such as an extruder separately or through the same feeding port to allow them to be co-present in the apparatus, or these materials are preliminarily uniformly mixed by means of a simple mixing device such as a tumbler, Henschel mixer, etc. When either of these materials is a large solid, these materials are preliminarily melt-kneaded and homogenized with a batch melt-kneading apparatus such as a roll, a kneader, a Banbury mixer, etc., and pelletized or pulverized so that they can be easily fed to a co-modifying apparatus.

Steps other than the step of allowing the polypropylene and the rubbery substance as starting materials to be co-present can be carried out in the same manner as that used for the production of the modified polypropylenes (A) and (B) or that used for the production of the modified rubbery substance (I), whereby the above materials are co-modified.

In said co-modification, the proportions of the polypropylene and the rubbery substance as starting materials can be properly selected. However, it is preferable to determine these proportions on the basis of the proportions of the modified polypropylenes (A) and (B) and the modified rubbery substance (I) in the thermoplastic polypropylene resin composition of the present invention.

When the co-modification is carried out, per 100 parts by weight of the polypropylene and the rubbery substance in total, the amount of the unsaturated carboxylic acid or a derivative thereof is preferably 0.01 to 20 parts by weight, more preferably 0.1 to 5 parts by weight; the amount of the unsaturated aromatic monomer, if the unsaturated aromatic monomer is used, is 0.01 to 15 parts by weight, more preferably 0.1 to 5 parts by weight; the weight ratio of the unsaturated aromatic monomer to the unsaturated carboxylic acid or a derivative thereof, if the saturated aromatic monomer is used, is 0.1 to 3.0, more preferably 0.5 to 2.0; and the amount of the radical initiator, if necessary, is preferably 0 to 5 parts by weight, more preferably 0.001 to 2 parts by weight.

In order to disperse the polypropylene and the rubbery substance as starting materials while dynamically co-modifying them, it is preferable to use a highly efficient melt-kneading apparatus such as a highly efficient twin-screw extruder, etc.

When producing the thermoplastic polypropylene resin composition of the present invention, a filler (L) can be incorporated for the purpose of reinforcement, function impartation and extension (cost-reduction).

The filler (L) can be selected from fibers such as glass fibers, carbon fibers, polyamide fibers, metal fibers, e.g. fibers of aluminum, stainless steel, etc., metal whiskers, etc., and inorganic such as silica, alumina, calcium carbonate, talc, mica, clay, kaolin, carbon black, $TiO_2$, ZnO, $Sb_2O_3$, etc.

All of these fillers can be used for reinforcement. Fillers such as carbon fibers, metal fibers, carbon black, etc., can lower the surface resistivity and the volume resistivity and impart electrical conductivity to the thermoplastic polypropylene resin composition of the present invention. Any filler that is less expensive than the resin can be used as an extender to reduce the cost.

For the purpose of improvement of the thermoplastic polypropylene resin composition in stiffness and heat resistance, it is particularly preferred to select the filler (L) from inorganic fillers such as glass fibers, a potassium titanate whisker, talc, mica, potassium carbonate, etc., and carbon fibers.

It is one of preferred embodiments to use the thermoplastic polypropylene-based resin composition of the present invention as a composite material by further incorporating thereinto a flame-retardant or flame retardant auxiliary, a lubricant, a nuclear agent, a plasticizer, a dye, a pigment, an antistatic agent, an antioxidant, a weatherability-imparting agent, etc.

The polypropylene resin/saturated polyester resin composition in the thermoplastic polypropylene resin composition of the present invention contains 1 to 99% by weight, preferably 20 to 98% by weight of the polypropylene resin (E) as a first component. When the content of the polypropylene resin is less than 1% by weight, the resultant thermoplastic resin composition is not sufficient in molding processability, toughness, water resistance, chemical resistance, etc.

When the composition containing the graft polypropylene (A) and/or the graft polypropylene (B) and the polypropylene (C) is used as a polypropylene (E), the content of the graft polypropylene (A) and/or the graft polypropylene (B) in this composition is required to be not less than 5% by weight. When said content is less than 5% by weight, the final resin composition has a problem in compatibility and dispersibility. Further, no sufficient toughness and impact resistance can be obtained, nor are the coating properties and printability sufficient.

The content of the saturated polyester resin (F) in the thermoplastic polypropylene resin composition of the present invention is less than 50% by weight, preferably 45 to 1% by weight. The saturated polyester resin (F) produces an effect on improvement in heat resistance, stiffness, strength, etc. When the above content is more than 50% by weight, no desirable properties can be obtained with regard to molding processability, toughness, water resistance, chemical resistance, etc. Further, there are also problems in that the resultant resin composition has high specific gravity and is expensive.

The amount of the epoxy group-containing copolymer (G) per 100 parts by weight of the resin composition composed of the polypropylene resin (E) and the saturated polyester resin (F) is 0.1 to 300 parts by weight, preferably 1 to 200 parts by weight. When this amount is less than 1 part by weight, the resultant resin composition is sometimes poor in compatibility and dispersibility, and it exhibits insufficient toughness and impact resistance and poor extrusion stability. The thermoplastic resin composition containing more than 100 parts by weight of the epoxy group-containing copolymer (G) is useful as an elastomer. However, when the above amount exceeds 300 parts by weight, the resultant resin composition shows great degradation in toughness, heat resistance, etc., and no desirable result can be obtained.

The amount of the rubbery substance (H) and/or the modified rubbery substance (I), which are used to improve the impact resistance, low-temperature impact resistance in particular, is 0.1 to 300 parts by weight, preferably 1 to 200 parts by weight per 100 parts by weight of the thermoplastic resin composition comprising the polypropylene resin (E) and the saturated polyester resin (F). When this amount is less than 0.1 part by weight, no effect is produced on the impact resistance. The thermoplastic resin composition containing more than 100 parts by weight of the rubbery substance (H) and/or the modified rubbery substance (I) is useful as an elastomer. However, when the above amount exceeds 300 parts by weight, the resultant resin composition shows great degradation in toughness, heat resistance, etc., and no desirable result can be obtained.

In the graft resin composition (J) or (K) in the thermoplastic propylene resin composition of this invention, a mixture of 1 to 99% by weight, preferably 20 to 98% by weight of the polypropylene (C) with 99 to 1% by weight, preferably 98 to 20% by weight of the rubbery substance (H) is graft-polymerized with the unsaturated carboxylic acid or a derivative thereof in the case of (J) or with the unsaturated carboxylic acid or a derivative thereof and the unsaturated aromatic monomer in the case of (K). When the amount of the rubbery substance (H) is less than 1% by weight, no effect is produced on improvement in impact resistance, and when the amount of the polypropylene (C) is less than 1% by weight, the resultant resin composition shows insufficient molding properties, toughness, water resistance and chemical resistance.

The amount of the polypropylene (C) per 100 parts by weight of the graft resin composition (J) or (K) is 0 to 1,900 parts by weight. The amount of the graft polypropylene contained in the graft resin composition (J) or (K) is required to be not less than 5% by weight based on the total amount of the graft polypropylene and the polypropylene (C) contained in the graft resin composition (J) or (K). When this amount is less than 5% by weight, the final resin composition shows poor compatibility and dispersibility, and no sufficient toughness and impact resistance can be obtained. Nor are coating properties, adhesive properties and printability sufficient.

The saturated polyester resin is incorporated in an amount that is 0.1 to 600 parts by weight, preferably 2 to 500 parts by weight per 100 parts by weight of the graft resin composition (J) or (K). The content of the saturated polyester resin based on the thermoplastic resin composition as a whole is less than 50% by weight, preferably 45 to 1% by weight. When this content is more than 50% by weight, no desirable properties can be obtained with regard to molding properties, toughness, water resistance and chemical resistance. Further, the epoxy group-containing copolymer (G) is incorporated in an amount of 0.1 to 300 parts by weight, preferably 1 to 200 parts by weight. When this amount is less than 0.1 part by weight, the resultant resin composition is poor in compatibility and dispersibility, and it exhibits insufficient toughness and impact resistance and poor extrusion stability. The thermoplastic resin composition containing more than 100 parts by weight of the epoxy group-containing copolymer (G) is useful as an elastomer. However, when the above amount exceeds 300 parts by weight, the resultant resin composition shows great degradation in toughness, heat resistance, etc., and no desirable result can be obtained.

The amount of the filler (L), which is used for reinforcement, function impartation or extension (cost-reduction) in the thermoplastic propylene resin composition of the present invention, is 0.01 to 300 parts by weight, preferably 1 to 200 parts by weight per 100 parts by weight of the thermoplastic resin composition comprising the polypropylene resin (E), the saturated polyester resin (F), the epoxy group-containing copolymer (G) and the rubbery substance (H) and/or the modified rubbery substance (I) or the thermoplastic resin composition comprising the graft resin composition (J) or (K), the saturated polyester resin (F) and the epoxy group-containing copolymer (G).

When the above amount is less than 0.01 part by weight, no filling effect can be obtained. When it is more than 300 parts by weight, the resultant resin composition shows degradation in toughness and impact resistance. And, properties inherent to the resins are lost and the resultant resin composition is brittle. Thus, no desirable result can be obtained.

The process for the production of the thermoplastic polypropylene resin composition of the present invention is not critical, and conventional processes can be applied.

It may be effective to employ a process which comprises mixing the starting materials in a solution state and evaporating a solvent or precipitating the resin composition in a non-solvent. From an industrial viewpoint, it is preferred to employ a process which comprises kneading the starting materials in a molten state. The melt-kneading can be carried out by means of a variety of kneading apparatus such as a Banbury mixer, an extruder, a roll, a kneader, etc.

For the melt-kneading, it is preferable to preliminarily mix the resin components all in a powder or pellet form uniformly with an apparatus such as a tumbler or a Henschel mixer. If necessary, it is possible to individually feed predetermined amount of the resin components to a kneading apparatus without the preliminary mixing.

The kneaded resin composition is molded by various molding methods such as injection molding, extrusion molding, etc. The scope of the present invention also includes the composition obtained by a method in which a molded article is produced by dry-blending the starting materials during injection molding or extrusion molding without carrying out the preliminary mixing step, and kneading the resultant composition during melt processing.

In the present invention, the kneading order is not critical: The graft polypropylene (A) and/or the graft polypropylene (B), the polypropylene (C), the saturated polyester resin (F), the epoxy group-containing copolymer (G), the rubbery substance (H) and/or the modified rubbery substance (I), and optionally, the filler (L) may be kneaded in one lot; The polypropylene resin (E) is preliminary prepared by kneading the graft polypropylene (A) and/or the graft polypropylene (B), or a composition containing the graft polypropylene (A) and/or the graft polypropylene (B) and the polypropylene (C), and thereafter, and the saturated polyester resin (F), the epoxy group-containing copolymer (G), the rubbery substance (H) and/or the modified rubbery substance (I) and optionally the filler (L) may be added to, and kneaded with, the polypropylene resin (E); The polypropylene resin (E) and the saturated polyester resin (F) may be preliminarily kneaded, and thereafter, the epoxy group-containing copolymer (G), the rubbery substance (H) or the modified rubbery substance (I) and optionally, the basic compound (H) may be added to, and kneaded with, the polypropylene resin (E); and some other kneading orders may be selected. However, when the graft polypropylene (A) and/or the polypropylene (B) and the epoxy group-containing copolymer (G), the epoxy group-containing copolymer (G) and the modified rubbery substance (I), or the saturated polyester resin (F) and the epoxy group-containing copolymer (G) are preliminary kneaded, a gel is sometimes formed depending upon proportions of these two components. In such a case, it is necessary to select suitable proportions of the two components properly before the preliminary kneading of them.

The kneading order for the thermoplastic resin composition comprising the graft resin composition (J) formed by graft polymerization with the unsaturated carboxylic acid or a derivative thereof or the graft resin composition (K) formed by graft polymerization with the unsaturated carboxylic acid or a derivative thereof and the unsaturated aromatic monomer in place of the graft polypropylene (A) and/or the graft polypropylene (B) and the modified rubbery substance (I) may be determined in the same way as above.

In order to simplify the kneading step, the step for the preliminary production of the graft resin composition (J) or (K) may be integrated into the kneading step for the thermoplastic propylene resin composition of the present invention.

That is, the thermoplastic resin composition of the present invention may be produced by co-modifying a polypropylene and a rubbery substance as starting materials in a first step, and charging the polypropylene (C), the saturated polyester resin (F), the epoxy group-containing copolymer (G) and optionally, the filler (L) to a site where the modified material or the co-modified materials are in a molten state in a second step.

In order to produce the thermoplastic polypropylene resin composition of the present invention more effectively, it is preferred to use a highly efficient twin-screw extruder having a high L/D ratio and two or more feeding port. That is, the materials for the co-modification are charged through a first feeding port, and co-modified sufficiently until components other than the graft polypropylenes (A) and (B) and the rubbery substance (H) are charged through a next feeding port, and then, the other components are charged through a second feeding port to knead the resultant mixture, whereby the composition can be efficiently produced.

The kneading may be carried out in a variety of methods in order to allow the thermoplastic propylene resin composition of the present invention to exhibit desired physical properties: In order to have the impact resistance exhibited efficiently, part of the epoxy group-containing copolymer (G) is preliminarily kneaded with the saturated polyester resin and the remaining components are added to, and kneaded with, the kneaded mixture; In order to have the stiffness and heat resistance exhibited efficiently under reinforcement with the filler (L), the filler (L) is preliminarily kneaded with one resin which can well disperse the filler (L) and constitutes the thermoplastic polypropylene resin composition of the present invention, and then the remaining components are added to, and kneaded with, the resultant kneaded mixture, or alternatively, the filler (L) is charged halfway along an extruder while the resin composition is in a preliminary melted and kneaded state and the resultant mixture is kneaded; and some other methods.

The thermoplastic resin composition of the present invention can be molded by a general molding or forming method such as injection molding, extrusion molding, compression molding, blow molding, roll molding, lamination molding, vacuum forming, pressure molding, etc. The present invention includes, in its scope, a method in which the components are dry-blended during injection molding or extrusion molding without a step of preliminary kneading, and the resultant dry blend is kneaded during melt-processing.

Of the above molding and forming methods, an injection molding method is preferred from the viewpoint of productivity, etc. A-molded article is obtained by preliminarily drying a pelletized composition in a vacuum dryer, a hot air dryer, etc., and injection-molding the composition under predetermined conditions including injection rate, injection time, cooling temperature, etc.

The present invention will be explained hereinafter by reference to Examples, to which the present invention shall not be limited.

Methods for measuring the physical properties in Examples are described below.

(1) Specific Gravity

Measured according to the method specified in JIS K6758.

(2) Melt Flow Rate

Measured according to the method specified in JIS K6758. The measurement temperature was 230° C., and the load was 2.16 kg unless otherwise specified.

(3) Tensile Test

Carried out according to the method specified in ASTM D638. A test piece having a thickness of 3.2 mm was measured for a tensile yield strength and a tensile elongation. The measurement temperature was 23° C. unless otherwise specified.

(4) Flexural Test

Carried out according to the method specified in JIS K7203. A test piece having a thickness of 3.2 mm was measured for a flexural modulus and a flexural strength at a span length of 50 mm at a loading rate of 1.5 mm/minute. The measurement temperature was 23° C. unless otherwise specified. When the test was carried out at a temperature other than 23° C., a sample was conditioned in a constant temperature bath at a predetermined temperature for 2 hours before the test.

(5) Izod Impact Strength

Measured according to the method specified in JIS K7110. A test piece having a thickness of 3.2 mm was measured for a notched impact strength. The measurement temperature was 23° C. unless otherwise specified. When the measurement was carried out at a temperature other than 23° C., a sample was conditioned in a constant temperature bath at a predetermined temperature for 2 hours before the measurement.

(6) Penetration Impact Strength

A high rate impact tester (RIT-8000, supplied by Rheometrics Inc. (U.S.A.)) was used. A deformation degree and stress of a flat test piece having a thickness of 3 mm were detected by fixing the test piece with a 2-inch circular holder and hitting a ⅝-inch impact probe (tip spherical surface: 5/16 inch Radius) against the test piece at a rate of 3 m/second, and a curve was prepared as shown in FIG. 1 on the basis of the resultant measurement values. The penetration impact strength was evaluated by integrating the area along the curve.

One example of measurement charts in evaluation of penetration impact strength is shown in FIG. 1, in which the abscissa axis indicates a displacement amount (D: mm) showing deformation of the test piece and the ordinate axis indicates a stress (N: newton) to a displacement amount. Both of these values were continuously detected and continuously plotted in an X-Y plotter whereby said measurement chart was obtained.

A yield point energy was obtained by integrating areas of the deformation amount and the stress from a start of stress detection to a yield of a material, and a total energy was obtained by integrating areas of the displacement amount and the stress from a start portion to a fracture point.

The fracture state of a material was determined to be ductile fracture (D) or brittle fracture (B) by observing a test piece actually subjected to a fracture test.

An energy value required for yield of a material was evaluated in terms of energy at a yield point, and an energy value required for fracture of a material was evaluated in terms of total energy, and these values are shown in a unit of joule (J).

A sample was conditioned in a constant temperature bath attached to the apparatus. A test piece was placed in the constant temperature bath adjusted to a predetermined temperature and conditioned for 2 hours before the above test. The predetermined temperature was used as a measurement temperature.

(7) Heat Distortion Temperature

Measured according to the method specified in JIS K7207. The fiber stress was measured at 4.6 kg/cm$^2$.

(8) Rockwell Hardness

Measured according to the method specified in JIS K7207. The thickness of a test piece was 3.2 mm, Radius was used as a steel ball, and the evaluation value was expressed on R scale.

(9) Graft Amount of Maleic Anhydride and Styrene

The graft amount of maleic anhydride on the graft polypropylene (A) was determined by dissolving a small amount of a sample in hot xylene, forming a precipitate with anhydrous acetone to purify the sample, then redissolving the purified sample in xylene, and titrating the resultant solution with a methanol solution of NaOH while the solution was under heat (110° to 120° C.), and phenolphthalein was used as an indicator.

The graft amount of the maleic anhydride in the modified rubbery substance (G) was determined by dissolving a small amount of a sample in toluene, forming a precipitate with anhydrous acetone to purify the sample, then redissolving the purified sample in toluene, and titrating the resultant solution with a ethanol solution of KOH while the solution was under heat (85° C.), and phenolphthalein was used as an indicator. The graft amount of styrene was determined on the basis of intensity of an absorption peak derived from substituted benzene rings observed in an infrared absorption spectrum of the above purified sample.

(10) Number Average Molecular Weight

Measured by gel permeation chromatography (GPC) under the following conditions.
GPC: type 150C, supplied by Waters.
Column: Shodex 80 MA, supplied by Showa Denko K.K.
Sample amount: 300 µl (polymer concentration: 0.2 wt %)
Flow rate: 1 ml/min.
Temperature: 135° C.
Solvent: Trichlorobenzene A calibration curve for calculation of the number average molecular weight was prepared by a conventional method using standard polystyrene supplied by TOSOH Corp. A data processor CP-8 Model III supplied by TOSOH Corp was used for data processing.

(11) Ethylene Content

The ethylene content was determined by preparing a press sheet, measuring it for an infrared absorption spectrum, and using a calibration curve from absorbances of characteristic absorptions of methyl ($-CH_3$) and methylene ($-CH_2-$) which were observed in the infrared absorption spectrum.

The test pieces for determining the above physical properties were prepared under the following injection molding conditions unless otherwise specified. Compositions were dried in a hot-air dryer at 120° C. for 2 hours and injection-molded with an injection molding machine, model IS150E-V, supplied by Toshiba Machinery Co., Ltd. at a molding temperature of 240° C. and a mold-cooling temperature of 70° C. for an injection time of 15 seconds and a cooling time of 30 seconds.

Compositions described below were produced under the following conditions unless otherwise specified. A predetermined amount of each of the components for the compositions was weighed, and the components were preliminarily mixed uniformly with a Henschel mixer, and then kneaded in a twin-screw continuous kneading machine (model TEX SS 30BW-2V, supplied by Japan Steel Works Ltd.) at an extrusion rate of 30 kg/hour, a resin temperature of 240° C. and a screw revolution rate of 350/minute while suction was carried out through a vent. The screws were composed of two sets of a triple-thread rotor and a triple-thread disc which were placed in two kneading zones, i.e., one zone next to a first feed opening and the other zone next to a second feed opening.

EXAMPLES 1-3 AND COMPARATIVE EXAMPLES 1 to 2

A graft polypropylene (A) was prepared in the following manner. A propylene homopolymer which was a starting material prepared by a slurry polymerization method according to the process described in JP-A-60-28405, and which had a melt flow rate of 1.3 g/10 minute, an intrinsic viscosity, measured in tetralin at 135° C., of 2.45 dl/g, a 20° C. cold xylene-soluble content of 2.9% by weight, a boiling heptane-soluble content of 6.7% by weight, and an isotactic pentad, in its boiling heptane-insoluble portion, of 0.955 was modified in the following manner.

100 Parts by weight of the propylene homopolymer as a starting material, 1.0 part by weight of maleic anhydride, 0.6 part by weight of a radical initiator prepared by allowing a propylene homopolymer to support 8% by weight of 1,3-bis(t-butylperoxyisopropyl)benzene (Sanperox®-TY1-3 supplied by Sanken Kako Co., Ltd.) and 0.1 part by weight of Irganox® 1010 (supplied by Ciba Geigy, Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-grafted polypropylene (A) having a maleic anhydride graft amount of 0.08% by weight and a melt flow rate of 36 g/10 minutes. This graft polypropylene (A) is abbreviated as M-PP-1 hereinafter. Polybutylene terephthalate (Tafpet PBT® N1000, supplied by Mitsubishi Rayon Co., Ltd.) was used as a saturated polyester resin (F). This polybutylene terephthalate as a starting material is abbreviated as PBT-1 hereinafter.

An epoxy group-containing copolymer (G) was prepared in the following manner. A terpolymer having a melt flow rate of 21 g/10 minutes (190° C., load: 2.16 kg) and having an ethylene/methyl methacrylate/glycidyl methacrylate weight ratio of 64/14/22 (% by weight) was prepared by a high-pressure radical polymerization method according to the process described in JP-A-47-23490 and JP-A-48-11888. This epoxy group-containing copolymer is abbreviated as E-MA-GMA-1 hereinafter.

A modified rubbery substance (I) was prepared in the following manner. 100 Parts by weight of a styrene-ethylene-butylene-styrene block copolymer rubber (Kraton®-G1657, supplied by Shell Chemical, Ltd.) having a number average molecular weight of 50,000, a number average molecular weight, in its styrene block, of 35,000 and a styrene block/ethylene block weight ratio of 30/70, 1.0 part of maleic anhydride, and 1.0 part by weight of a radical initiator prepared by allowing a propylene homopolymer to support 8% by weight of 1,3-bis(t-butylperoxyisopropyl)benzene (Sanperox®-TY1.3 supplied by Sanken Kako Co., Ltd.) were uniformly mixed with a Henschel mixer, and the resultant mixture was melt-kneaded in a twin-screw extruder, TEX 44 SS 30BW-2V, supplied by Japan Steel Works Ltd., under nitrogen atmosphere at a kneading temperature of 250° C. and an extrusion rate of 30 kg/hour to give a modified styrene-ethylene-butylene-styrene block copolymer rubber having a maleic anhydride graft amount of 0.38% by weight.

This modified styrene-ethylene-butylene-styrene copolymer rubber is abbreviated as M-SEBS-1 hereinafter.

The above starting materials were mixed in such a manner that the proportions of M-SEBS-1 and E-MA-GMA-1 were constant and those of M-PP-1 and PBT-1 were changed as shown in Table 1, and compositions were produced under predetermined conditions. Test pieces were prepared from the compositions under predetermined injection conditions, and evaluated according to the foregoing methods. Table 1 shows the results of the evaluation of the physical properties of the test pieces.

Although Izod impact strength is generally employed for impact resistance evaluation, there are many substances having high penetration impact strength even if their Izod impact strength is low. Polybutylene terephthalate has a lower notched Izod impact strength at −30° C. than does a propylene-ethylene-propylene block copolymer but has a remarkably higher penetration impact strength than does the above block copolymer. An actual service of some automobile parts is evaluated by low-temperature ball dropping test, and this actual service evaluation and a laboratory test on the penetration impact strength give well consistent results. In evaluation of the penetration impact strength, a test piece exhibiting a higher energy at yield point and higher total energy is rated to be better. The energy at yield point and the total energy are calculated from the measurement chart. Further, the fracture state of a test piece at a fracture point is important for association of the penetration impact strength with the actual service evaluation.

The fracture state cannot be determined from the measurement chart, but is judged by observing a fracture state of a test piece. A fracture state in which a sharp crack is formed or a test piece is divided into several pieces is referred to as "brittle fracture". A fracture state in which a test piece is fractured along the shape of an impact probe without formation of a sharp crack and division into several pieces is referred to as "ductile fracture". A composition which exhibits the ductile fracture is preferable to one which exhibits the brittle fracture.

Table 2 shows that the test pieces obtained in Examples 1 to 4 of the present invention exhibit a far more improved Izod impact strength and penetration impact strength than those test pieces of Comparative Examples 1 and 2 which does not contain any modified styrene-ethylene.butylene-styrene block copolymer rubber.

EXAMPLES 5 AND 6

A modified rubbery substance was prepared in the following manner. 100 Parts by weight of the same Kraton®-G 1657 (supplied by Shell Chemical, Ltd.) as that used in Example 1, 1.0 part by weight of maleic anhydride, 0.5 part by weight of styrene and 0.6 part by weight of a radical initiator were treated in the same manner as in Example 1, whereby there was produced a modified styrene-ethylene-butylene block copolymer rubber having a maleic anhydride graft amount of 0.42% by weight.

The above modified styrene-ethylene-butylene-styrene copolymer rubber is abbreviated as MS-SEBS-1 hereinafter.

A composition was prepared by using the same starting materials as those in Example 2 in proportions as shown in Table 1 under the predetermined kneading conditions except for the use of the above MS-SEBS-1 as a modified rubbery substance (I). A test piece was prepared from the composition under the predetermined injection conditions, and physical properties of the test piece were evaluated according to the predetermined evaluation methods. Table 2 shows the results of the physical property evaluation.

EXAMPLE 7

A composition was prepared under the predetermined kneading conditions by using the same starting materials as those in Example 4 in proportions as shown in Table 1 except that the same Kration®-G 1657 as that used in Example 1 was used without modifying it. A test piece was prepared from the composition under the predetermined injection conditions, and physical properties of the test piece were evaluated according to the predetermined evaluation methods. Table 2 shows the results of the physical property evaluation.

EXAMPLE 8

An epoxy group-containing copolymer (G) was prepared in the following manner. A terpolymer having a melt flow rate of 7 g/10 minutes (190° C., load 2.16 kg) and having an ethylene/vinyl acetate/glycidyl methacrylate weight ratio of 85/5/10 (% by weight) was prepared by a high-pressure radical polymerization method according to the process described in JP-A-47-23490 and JP-A-48-11888. This epoxy group-containing copolymer is abbreviated as E-VA-GMA-1 hereinafter.

A composition was prepared in the same way as in Examples 1 to 4 by using the same starting materials as those in Example 5 in proportions as shown in Table 1 except that E-VA-GMA-1 was used as an epoxy group-containing copolymer (G). Table 2 shows the results of the physical property evaluation.

EXAMPLE 9

A graft polypropylene (B) was prepared in the following manner. A propylene homopolymer which was a starting material prepared by a slurry polymerization method according to the process described in JP-A-60-28405, and which had a melt flow rate of 1.3 g/10 minutes, an intrinsic viscosity, measured in tetralin at 135° C., of 2.45 dl/g, a 20° C. cold xylene-soluble content of 2.9% by weight, a boiling heptane-soluble content of 6.7% by weight, and an isotactic pentad, in its boiling heptane-insoluble portion, of 0.955 was modified in the following manner.

100 Parts by weight of the propylene homopolymer as a starting material, 1.0 part by weight of maleic anhydride, 0.5 part by weight of styrene, 0.6 part by weight of a radical initiator prepared by allowing a propylene homopolymer to support 8% by weight of 1,3-bis(t-butylperoxyisopropyl)benzene (Sanperox®-TY1-3 supplied by Sanken Kako Co., Ltd.) and 0.1 part by weight of Irganox® 1010 (supplied by Ciba Geigy, Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride.styrene-grafted polypropylene (B) having a maleic anhydride graft amount of 0.15% by weight, a styrene graft amount of 0.07% by weight and a melt flow rate of 21 g/10 minutes. This graft polypropylene (B) is abbreviated as MS-PP-1 hereinafter.

A composition was prepared in the same way as in Examples 1 to 4 by using the same proportion of the same starting materials as those in Example 1 except that graft polypropylene MS-PP-1 was used in place of the graft polypropylene (A). Table 2 shows the results of the physical property evaluation.

EXAMPLE 10

A composition was prepared in the same way as in Examples 1 to 4 by using the same proportion of the same starting materials as those in Example 5 except that MS-PP-1 was used as a graft polypropylene (B).

Table 2 shows the results of the physical property evaluation.

EXAMPLE 11

A composition was prepared in the same way as in Examples 1 to 4 by using the same proportion of the same starting materials as those in Example 6 except that graft polypropylene MS-PP-1 was used as a graft polypropylene (B). Table 2 shows the results of the physical property evaluation.

EXAMPLE 12

A composition was prepared in the same way as in Example 1 except that a cografted product of M-PP-1 and M-SEBS-1 as a graft resin composition (J) was used in place of the M-PP-1 and M-SEBS-1. 100 Parts by weight of a composition obtained by mixing a polypropylene powder as a starting material for M-PP-1 with pellets of a styrene-ethylene-butylene-styrene block copolymer rubber as a material for M-SEBS-1 in a mixing ratio of 70/15, 1.0 part by weight of maleic anhydride, 0.6 part by weight of a radical initiator prepared by allowing a propylene homopolymer to support 8% by weight of 1,3-bis(t-butylperoxyisopropyl)benzene (Sanperox®-TY1-3 supplied by Sanken Kako Co., Ltd.) and 0.1 part by weight of Irganox® 1010 (supplied by Ciba Geigy) as a stabilizing were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-cografted polypropylene/styrene-ethylene-butylene-styrene block copolymer rubber having a maleic anhydride graft amount of 0.13% by weight and a melt flow rate of 15 g/10 minutes. This co-modified product is abbreviated as M-(PP/SEBS)-1 hereinafter.

A composition was prepared in the same way as in Example 1 except that the co-modified product M-(PP/SEBS)-1 was used, and physical properties thereof were evaluated. Table 2 shows the results of the physical property evaluation.

A test piece prepared from the above composition containing the co-modified product M-(PP/SEBS)-1 exhibited as excellent Izod impact strength and penetration impact strength as those of the test piece of Example 1 prepared from the composition containing the individually modified products M-PP-1 and M-SEBS-1.

EXAMPLE 13

A graft resin composition (J) was prepared by repeating the same procedure as in Example 12 except that the polypropylene powder/styrene-ethylene.butylene-styrene block copolymer rubber weight ratio was changed to 55/20, whereby a maleic anhdyride-cografted polypropylene/styrene-ethylene.butylene-styrene block copolymer rubber was obtained. This graft product is abbreviated as M-(PP/SEBS)-2 hereinafter.

A composition was prepared in the same way as in Example 4 except that the cografted product M-(PP/SEBS)-2 was used as shown in Table 1, and physical properties thereof were evaluated. Table 2 shows the results of the physical property evaluation.

A test piece prepared from the above composition containing the cografted product M-(PP/SEBS)-2 exhibited as excellent Izod impact strength and penetration impact strength as those of the test piece of Example 4 prepared from the composition containing the individually modified products M-PP-1 and M-SEBS-1.

EXAMPLES 14 AND 15

A composition was prepared in the same way as in Example 10 except that a cografted product of MS-PP-1 and MS-SEBS-1 as a co-graft resin composition (K) was used in place of MS-PP-1 and MS-SEBS-1.

100 Parts by weight of a composition prepared by mixing a polypropylene powder as a starting material for MS-PP-1 with pellets of a styrene-ethylene.butylene-styrene block copolymer rubber as a starting material for MS-SEBS-1 in a mixing ratio of 70/15 or 55/20, 1.0 part by weight of maleic anhydride, 0.5 part by weight of styrene, 0.6 part by weight of a radical initiator prepared by allowing a propylene homopolymer to support 8% by weight of 1,3-bis(t-butylperoxyisopropyl)benzene (Sanperox®-TY1-3 supplied by Sanken Kako Co., Ltd.) and 0.1 part by weight of Irganox® 1010 (supplied by Ciba Geigy, Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-styrene-cografted polypropylene/styrene-ethylene.butylene-styrene block copolymer rubber having a maleic anhydride graft amount of 0.18% by weight and a melt flow rate of 9 g/10 minutes or that having a maleic anhydride-styrene-cografted polypropylene/styrene-ethylene.butylene-styrene block copolymer rubber having a maleic anhydride graft amount of 0.21% by weight and a melt flow rate of 10 g/10 minutes. These co-modified products are abbreviated as MS-(PP/SEBS)-1 and MS-(PP/SEBE)-2 hereinafter.

A composition was prepared in the same way as in Example 10 except that the cografted product MS-(PP/SEBS)-1 or MS-(PP/SEBE)-2 was used as shown in Table 1, and physical properties thereof were evaluated. Table 2 shows the results of the physical property evaluation.

Test pieces prepared from the above composition containing the cografted product MS-(PP/SEBS)-1 or MS-(PP/SEBE)-2 exhibited as excellent Izod impact strength and penetration impact strength as those of the test piece of Example 10 prepared from the composition containing the individually modified products MS-PP-1 and MS-SEBS-1.

EXAMPLE 16

As a graft polypropylene (B), there was used a highly crystalline propylene block copolymer which was obtained by a slurry polymerization method disclosed in JP-A-60-228504 and which had a melt flow rate of 7.5 g/10 minutes, an intrinsic viscosity, measured in tetralin at 135° C., of 2.18 dl/g, 84% by weight of a polypropylene homopolymer portion (to be abbreviated as P portion hereinafter) as a first segment formed by polymerization in a first step and 16% by weight of an ethylene-propylene copolymer portion (to be abbreviated as EP portion hereinafter) as a second segment formed by polymerization in a second step. The P portion had a molecular structure in which the intrinsic viscosity, measured in tetralin at 135° C., was 1.60 dl/g, the content of a 20° C. cold xylene-soluble portion was 1.6% by weight, the content of a boiling heptane-soluble portion was 4.6% by weight and the isotactic pentad of a boiling heptane-insoluble portion was 0,957, and the EP portion had a molecular structure in which the intrinsic viscosity, measured in tetralin at 135° C., was 5.2 dl/g and the ethylene/propylene weight ratio was 37/63 (% by weight). The above highly crystalline propylene block copolymer as a starting material is abbreviated as PP-3 hereinafter.

A maleic anhydride-styrene-cografted polypropylene/styrene-ethylene.butylene-styrene block copolymer rubber was prepared in the following manner.

100 Parts by weight of a composition obtained by mixing a polypropylene powder as a starting material for MS-PP-1 with pellets of a styrene-ethylene.butylene-styrene block copolymer rubber as a starting material for MS-SEBS-1 in a mixing ratio of 25/15, 1.0 part by weight of maleic anhydride, 0.5 part by weight of styrene, 0.5 part by weight of a radical initiator prepared by allowing a propylene homopolymer to support 8% by weight of 1,3-bis(t-butylperoxyisopropyl)benzene (Sanperox®-TY1-3 supplied by Sanken Kako Co., Ltd.) and 0.1 part by weight of Irganox® 1010 (supplied by Ciba Geigy, Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-styrene-cografted polypropylene (A)/styrene-ethylene.butylene-styrene block copolymer rubber having a maleic anhdyride graft amount of 0.25% by weight and a melt flow rate of 15 g/10 minutes. This co-modified product is abbreviated as MS-(PP/SEBS)-3. Further, a composition was prepared in the same way as in Examples 1 to 4 by incorporating PBT-1 as a saturated polyester resin (D) and E-MA-GMA-1 as an epoxy group-containing copolymer (E) in proportions as shown in Table 1, and physical properties thereof were evaluated. Table 2 shows the results of the physical property evaluation. When the propylene block copolymer was used as a polypropylene (B), the resultant composition exhibited a greatly improved fluidity, and desirable results were obtained with regard to both fluidity and physical properties.

The thermoplastic resin composition of the present invention produces remarkable effects in that not only the present composition exhibits excellent molding properties but also a molded article produced from the present composition exhibits excellent physical properties over a molded article produced from individual constituent polymers.

The novel resin composition of the present invention can be processed into molded articles, a film, a sheet, etc., by a molding method applied to conventional thermoplastic resins such as injection molding, extrusion molding, etc., and can give molded articles which have well balanced properties among stiffness, heat resistance, impact resistance, scratch resistance, coating properties, oil resistance, chemical resistance, water resistance, etc., and which have excellent appearance uniformity and smoothness. The thermoplastic resin composition of the present invention is suitably useful in fields where especially high-level heat resistance and impact resistance, low-temperature impact resistance in particular are required.

TABLE 1

| | Graft polypropylene or graft resin composition (wt. %) | | Saturated polyester resin (F) (wt. %) | | Epoxy group-containing copolymer (G) (wt. %) | | Modified rubbery substance (I) (wt. %) | | Rubbery substance (H) (wt. %) | | Polypropylene (C) (wt. %) | |
|---|---|---|---|---|---|---|---|---|---|---|---|---|
| Example 1 | M-PP-1 | 70 | PBT-1 | 5 | E-MA-GMA-1 | 10 | M-SEBS-1 | 15 | — | | — | |
| Example 2 | M-PP-1 | 55 | PBT-1 | 20 | E-MA-GMA-1 | 10 | M-SEBS-1 | 15 | — | | — | |
| Example 3 | M-PP-1 | 40 | PBT-1 | 35 | E-MA-GMA-1 | 10 | M-SEBS-1 | 15 | — | | — | |
| Example 4 | M-PP-1 | 55 | PBT-1 | 20 | E-MA-GMA-1 | 5 | M-SEBS-1 | 20 | — | | — | |
| Example 5 | M-PP-1 | 55 | PBT-1 | 20 | E-MA-GMA-1 | 10 | MS-SEBS-1 | 15 | — | | — | |
| Example 6 | M-PP-1 | 55 | PBT-1 | 20 | E-MA-GMA-1 | 5 | MS-SEBS-1 | 20 | — | | — | |
| Example 7 | M-PP-1 | 55 | PBT-1 | 20 | E-MA-GMA-1 | 5 | — | | SEBS-1 | 20 | — | |
| Example 8 | M-PP-1 | 55 | PBT-1 | 20 | E-VA-GMA-1 | 10 | M-SEBS-1 | 15 | — | | — | |
| Example 9 | MS-PP-1 | 70 | PBT-1 | 5 | E-MA-GMA-1 | 10 | M-SEBS-1 | 15 | — | | — | |
| Example 10 | MS-PP-1 | 55 | PBT-1 | 20 | E-MA-GMA-1 | 10 | MS-SEBS-1 | 15 | — | | — | |
| Example 11 | MS-PP-1 | 55 | PBT-1 | 20 | E-MA-GMA-1 | 5 | — | | SEBS-1 | 20 | — | |
| Example 12 | M-(PP/SEBS)-1 | 85 | PBT-1 | 5 | E-MA-GMA-1 | 10 | — | | — | | — | |
| Example 13 | M-(PP/SEBS)-1 | 75 | PBT-1 | 20 | E-MA-GMA-1 | 5 | — | | — | | — | |
| Example 14 | MS-(PP/SEBS)-1 | 85 | PBT-1 | 5 | E-MA-GMA-1 | 10 | — | | — | | — | |
| Example 15 | MS-(PP/SEBS)-2 | 75 | PBT-1 | 20 | E-MA-GMA-1 | 5 | — | | — | | — | |
| Example 16 | MS-(PP/SEBS)-3 | 40 | PBT-1 | 20 | E-MA-GMA-1 | 5 | — | | — | | PP-3 | 35 |
| Comparative Example 1 | — | | PBT-1 | 20 | E-MA-GMA-1 | 10 | — | | — | | PP-1 | 70 |
| Comparative Example 2 | — | | PBT-1 | 20 | — | | — | | SEBS-1 | 20 | PP-1 | 60 |
| Comparative Example 3 | — | | PBT-1 | 20 | E-MA-GMA-1 | 10 | — | | SEBS-1 | 10 | PP-1 | 60 |
| Comparative Example 4 | M-PP-1 | 60 | PBT-1 | 20 | — | | — | | SEBS-1 | 20 | — | |

TABLE 2

| | Physical properties | | | | |
|---|---|---|---|---|---|
| | | Tensile properties | | Flexural properties | |
| No. | Melt flow rate (g/10 min) | Strength at yield point (kg/cm$^2$) | Elongation at fracture point (%) | Modulus (kg/cm$^2$) | Strength (kg/cm$^2$) |
| Example 1 | 0.923 | 20.2 | 193 | 190 | 8900 | 263 |
| Example 2 | 0.969 | 12.3 | 187 | 160 | 9300 | 261 |

TABLE 2-continued

| | | | | | | |
|---|---|---|---|---|---|---|
| Example 3 | 1.021 | 2.3 | 213 | 90 | 9400 | 313 |
| Example 4 | 0.970 | 1.9 | 170 | >200 | 7800 | 240 |
| Example 5 | 0.967 | 10.1 | 195 | >200 | 8300 | 234 |
| Example 6 | 0.969 | 1.5 | 169 | >200 | 7700 | 238 |
| Example 7 | 0.971 | 1.7 | 172 | 180 | 8000 | 245 |
| Example 8 | 0.970 | 8.6 | 198 | 190 | 8700 | 246 |
| Example 9 | 0.925 | 16.7 | 181 | >200 | 7400 | 223 |
| Example 10 | 0.971 | 7.5 | 176 | >200 | 7700 | 221 |
| Example 11 | 0.968 | 1.4 | 178 | >200 | 8100 | 224 |
| Example 12 | 0.924 | 18.4 | 191 | >200 | 8800 | 261 |
| Example 13 | 0.970 | 1.7 | 188 | >200 | 7700 | 215 |
| Example 14 | 0.922 | 16.2 | 182 | >200 | 7500 | 256 |
| Example 15 | 0.969 | 1.6 | 184 | >200 | 7500 | 211 |
| Example 16 | 0.973 | 4.6 | 182 | >200 | 7300 | 208 |
| Comparative Example 1 | 0.970 | 1.0 | 275 | 100 | 15100 | 410 |
| Comparative Example 2 | 0.968 | 1.3 | 260 | 150 | 13500 | 371 |
| Comparative Example 3 | 0.971 | 1.6 | 259 | 170 | 13100 | 368 |
| Comparative Example 4 | 0.967 | 2.1 | 258 | 160 | 13400 | 368 |

| No. | Izod impact strength 23° C. (kg·cm/cm) | Izod impact strength −30° C. (kg·cm/cm) | Penetration impact strength (YE/TE) *1 23° C. (J: Joule) | Penetration impact strength (YE/TE) *1 −30° C. (J: Joule) | Thermal deformation (°C.) | Rockwell hardness $H_R$ |
|---|---|---|---|---|---|---|
| Example 1 | 16.0 | 5.0 | 28/48 (D-B) | 19/25 (B) | 104 | 71 |
| Example 2 | 17.6 | 6.1 | 27/49 (D-B) | 18/23 (B) | 100 | 69 |
| Example 3 | 8.6 | 5.7 | 26/47 (D-B) | 12/19 (B) | 101 | 70 |
| Example 4 | 43.3 | 7.5 | 28/50 (D) | 22/41 (B) | 91 | 59 |
| Example 5 | 26 | 5.8 | 27/49 (D-B) | 15/18 (B) | 95 | 61 |
| Example 6 | 46.1 | 7.7 | 28/51 (D) | 24/39 (D-B) | 91 | 58 |
| Example 7 | 18.4 | 6.3 | 26/48 (D-B) | 20/22 (B) | 94 | 62 |
| Example 8 | 17.2 | 5.3 | 25/45 (D-B) | 14/20 (B) | 96 | 63 |
| Example 9 | 78 | 6.1 | 28/49 (D) | 23/43 (D-B) | 90 | 68 |
| Example 10 | 85 | 8.8 | 29/52 (D) | 24/44 (D-B) | 95 | 66 |
| Example 11 | 68 | 5.7 | 27/49 (D-B) | 25/45 (D-B) | 97 | 68 |
| Example 12 | 23.5 | 6.4 | 28/50 (D-B) | 19/25 (B) | 103 | 70 |
| Example 13 | 85 | 30.1 | 29/52 (D) | 24/46 (D-B) | 93 | 63 |
| Example 14 | 30.7 | 6.6 | 29/51 (D-B) | 19/27 (B) | 101 | 69 |
| Example 15 | 91 | 38.1 | 28/52 (D) | 26/45 (D-B) | 90 | 62 |
| Example 16 | 95 | 41.1 | 29/52 (D) | 27/46 (D-B) | 89 | 61 |
| Comparative Example 1 | 4.2 | 2.8 | 18/21 (B) | 0.3/0.4 (B) | 124 | 96 |
| Comparative Example 2 | 4.8 | 3.2 | 19/25 (B) | 0.5/0.6 (B) | 119 | 92 |
| Comparative Example 3 | 5.1 | 3.6 | 21/25 (B) | 0.7/0.9 (B) | 116 | 90 |
| Comparative Example 4 | 5.0 | 3.3 | 18/20 (B) | 0.6/0.8 (B) | 118 | 91 |

Note)
*1 Penetration impact strength
YE: Yield point energy, TE: Total energy, (D) and (B) indicate a fracture state, (D) means ductile fracture and (B) means brittle fracture.

What is claimed is:

1. A thermoplastic resin composition which comprises:
   (a) 100 parts by weight of a graft resin composition (J) obtained by graft polymerizing at least one unsaturated carboxylic acid or derivative thereof selected from the group consisting of acrylic acid, methacrylic acid, maleic acid, itaconic acid, maleic anhydride and itaconic anhydride onto a mixture of 20 to 98% by weight of a crystalline polypropylene (C) and a rubbery substance (H) which is styrene-ethylene.butylene-styrene copolymer rubber, the total of (C) and (H) being 100% by weight, the number average molecular weight of the styrene polymer block in the styrene-ethylene,butylene-styrene copolymer rubber being 1,000 to 200,000, the number average molecular weight of the ethylene,butylene copolymer block in the styrene-ethylene.butylene-styrene copolymer rubber being 1,000 to 200,000, and the weight ratio of the styrene polymer block to the ethylene.butylene copolymer block being 10:90 to 40:60,
   (b) 0.1–600 parts by weight of at least one saturated polyester resin (F) selected from the group consisting of polyethylene terephthalate and polybutylene terephthalate,
   (c) 0.1–300 parts by weight of an epoxy group-containing copolymer (G) selected from the group consisting of a copolymer of ethylene and an unsaturated epoxy compound and a terpolymer of ethylene, an unsaturated epoxy compound and an ethylenic unsaturated compound other than ethylene, the unsaturated epoxy compound being at least one member selected from the group consisting of glycidyl acrylate, glycidyl methacrylate, glycidyl itaconate, allylglycidyl ether, 2-methylglycidyl ether and styrene-p-glycidyl ether, and the ethylenic unsaturated compound other than ethylene being at least one member selected from the group consisting of vinyl acetate, methyl acetate, ethyl acetate, methyl methacrylate, vinyl chloride, vinylidene chloride and isobutyl vinyl ether, the proportion of the unsaturated epoxy compound in the epoxy group-containing copolymer (G) being 0.1 to 50% by weight, and (d) 0 to 1,900 parts by weight per 100 parts by weight of the graft resin composition (J) of a crystalline polypropylene (C), wherein the amount of graft polypropylene contained in graft resin composition (J) is not less than 5% by weight based on the total amount of the graft polypropylene and the polypropylene (C) contained in the graft resin composition (J), the content of the saturated polyester resin (F) in the thermoplastic resin composition being 45 to 1% by weight.

2. A thermoplastic resin composition according to claim 1, wherein the thermoplastic resin composition further comprises 0.01–300 parts by weight of a filler (L).

3. A thermoplastic resin composition according to claim 2, wherein the unsaturated carboxylic acid or a derivative thereof is maleic anhydride.

4. A thermoplastic resin composition according to claim 2, wherein the filler (L) is a fiber or an inorganic filler selected from the group consisting of glass fiber, carbon fiber, talc and mica.

5. A thermoplastic resin composition according to claim 1, wherein the unsaturated carboxylic acid or a derivative thereof is maleic anhydride.

6. A thermoplastic resin composition which comprises:

(a) 100 parts by weight of a graft resin composition (J) obtained by graft polymerizing at least one unsaturated carboxylic acid or derivative thereof selected from the group consisting of acrylic acid, methacrylic acid, maleic acid, itaconic acid, maleic anhydride and itaconic anhydride onto a mixture of a crystalline polypropylene (C) and 98–20% by weight of a rubbery substance (H) which is styrene-ethylene.butylene-styrene copolymer rubber, the total of (C) and (H) being 100 percent by weight, the number average molecular weight of the styrene polymer block in the styrene-ethylene, butylene-styrene copolymer rubber being 1,000 to 200,000, the number average molecular weight of the ethylene.butylene copolymer block in the styrene-ethylene.butylene-styrene copolymer rubber being 1,000 to 200,000, and the weight ratio of the styrene polymer block to the ethylene.butylene copolymer block being 10:90 to 40:60, (b) 0.1–600 parts by weight of at least one saturated polyester resin (F) selected from the group consisting of polyethylene terephthalate and polybutylene terephthalate, (c) 0.1–300 parts by weight of an epoxy group-containing copolymer (G) selected from the group consisting of a copolymer of ethylene and an unsaturated epoxy compound and a terpolymer of ethylene, an unsaturated epoxy compound and an ethylenic unsaturated compound other than ethylene, the unsaturated epoxy compound being at least one member selected from the group consisting of glycidyl acrylate, glycidyl methacrylate, glycidyl itaconate, allylglycidyl ether, 2-methylglycidyl ether and styrene-p-glycidyl ether, and the ethylenic unsaturated compound other than ethylene being at least one member selected from the group consisting of vinyl acetate, methyl acetate, ethyl acetate, methyl methacrylate, vinyl chloride, vinylidene chloride and isobutyl vinyl ether, the proportion of the unsaturated epoxy compound in the epoxy group-containing copolymer (G) being 0.1 to 50% by weight, and (d) 0 to 1,900 parts by weight per 100 parts by weight of the graft resin composition (J) of a crystalline polypropylene (C), wherein the amount of graft polypropylene contained in graft resin composition (J) is not less than 5% by weight based on the total amount of the graft polypropylene and the polypropylene (C) contained in the graft resin composition (J), the content of the saturated polyester resin (F) in the thermoplastic resin composition being 45 to 1% by weight.

7. A thermoplastic resin composition according to claim 6, wherein the thermoplastic resin composition further comprises 0.01–300 parts by weight of a filler (L).

8. A thermoplastic resin composition according to claim 7, wherein the unsaturated carboxylic acid or a derivative thereof is maleic anhydride.

9. A thermoplastic resin composition according to claim 7, wherein the filler (L) is a fiber or an inorganic filler selected from the group consisting of glass fiber, carbon fiber, talc and mica.

10. A thermoplastic resin composition according to claim 6, wherein the unsaturated carboxylic acid or a derivative thereof is maleic anhydride.

* * * * *